US008892049B2

(12) United States Patent
Rosenblatt et al.

(10) Patent No.: US 8,892,049 B2
(45) Date of Patent: Nov. 18, 2014

(54) HANDHELD ELECTRONIC DEVICES WITH ANTENNA POWER MONITORING

(75) Inventors: Michael N. Rosenblatt, Campbell, CA (US); Louie J. Sanguinetti, Los Gatos, CA (US); Erturk D. Kocalar, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 2062 days.

(21) Appl. No.: 11/974,115

(22) Filed: Oct. 10, 2007

(65) Prior Publication Data

US 2009/0096683 A1 Apr. 16, 2009

(51) Int. Cl.
*H04B 17/00* (2006.01)
*H01Q 1/24* (2006.01)

(52) U.S. Cl.
CPC .................................... *H01Q 1/242* (2013.01)
USPC ......................... 455/67.11; 343/702; 343/703

(58) Field of Classification Search
USPC ................................ 455/67.11; 343/702, 703
See application file for complete search history.

(56) References Cited

U.S. PATENT DOCUMENTS 5,451,965 A 9/1995 Matsumoto
5,748,054 A 5/1998 Tonegawa et al.
5,777,693 A 7/1998 Kishigami et al.
6,242,982 B1 6/2001 Ibelings et al.
6,275,684 B1 8/2001 Kaneko et al.
6,483,463 B2 11/2002 Kadambi et al.
6,611,227 B1 * 8/2003 Nebiyeloul-Kifle et al. . 342/173
6,757,267 B1 6/2004 Evans et al.
6,761,316 B2 7/2004 Bridgelall et al.
6,806,835 B2 10/2004 Iwai et al.
7,116,959 B1 10/2006 Link et al.
7,149,483 B1 12/2006 Reinisch et al.
7,187,332 B2 3/2007 Kezys et al.
2002/0027474 A1 * 3/2002 Bonds .......................... 330/149
2002/0094789 A1 * 7/2002 Harano .......................... 455/90
2002/0123309 A1 * 9/2002 Collier et al. ............... 455/67.1
2003/0186728 A1 * 10/2003 Manjo ........................ 455/575.7
2004/0222926 A1 * 11/2004 Kontogeorgakis et al. ... 343/702
2005/0245204 A1 * 11/2005 Vance ............................ 455/80

* cited by examiner

*Primary Examiner* — Ping Hsieh
*Assistant Examiner* — Erica Fleming-Hall
(74) *Attorney, Agent, or Firm* — Treyz Law Group; G. Victor Treyz; David C. Kellogg

(57) ABSTRACT

Handheld electronic devices are provided that contain wireless communications circuitry. The wireless communications circuitry may include an antenna. A radio-frequency coupler may be coupled to the antenna. Transceiver circuitry may be used to transmit and receive radio-frequency signals through the coupler and the antenna. A reflected power detection circuit may be connected to the coupler. When the transceiver circuitry transmits radio-frequency signals, some of the signals are reflected back from the antenna into the coupler. The coupler directs the reflected antenna signals into the reflected power detection circuit. Processing circuitry may analyze a reflected power signal from the reflected power detection circuit to determine whether operation of the antenna is being disrupted by the placement of a user's hand over the antenna or other proximity effects. If antenna operation is being disrupted, the user may be alerted or other suitable actions may be taken.

17 Claims, 9 Drawing Sheets

HANDHELD ELECTRONIC DEVICES WITH ANTENNA POWER MONITORING

BACKGROUND

This invention relates generally to wireless communications, and more particularly, to wireless handheld electronic devices in which monitoring and control circuitry is used to measure wireless signal powers.

Handheld electronic devices are becoming increasingly popular. Examples of handheld devices include handheld computers, cellular telephones, media players, and hybrid devices that include the functionality of multiple devices of this type.

Due in part to their mobile nature, handheld electronic devices are often provided with wireless communications capabilities. Handheld electronic devices may use long-range wireless communications to communicate with wireless base stations. For example, cellular telephones may communicate using cellular telephone bands at 850 MHz, 900 MHz, 1800 MHz, and 1900 MHz. Handheld electronic devices may also use short-range wireless communications links. For example, handheld electronic devices may communicate using the WiFi® (IEEE 802.11) band at 2.4 GHz and the Bluetooth® band at 2.4 GHz. Communications are also possible in data service bands such as the 3 G data communications band at 2170 MHz band (commonly referred to as UMTS or Universal Mobile Telecommunications System). Some handheld devices receive Global Positioning System (GPS) signals at 1575 MHz.

A number of compromises are typically made when designing an antenna for a handheld electronic device. For example, antennas that protrude excessively from a device housing may be unsightly. Antennas that are located within a device housing may be more desirable from an esthetic point of view, but can be challenging to design. Internal antennas are sometimes subject to proximity effects that make antenna performance dependent on the position of a user's body relative to the antenna. Moreover, internal antennas may require the use of compact designs that are not as efficient as bulky external antennas.

Compact internal antennas for handheld devices may fabricated by patterning a metal layer on a circuit board substrate or may be formed from a sheet of thin metal using a foil stamping process. Many handheld devices use planar inverted-F antennas (PIFAs). Planar inverted-F antennas are formed by locating a planar resonating element above a ground plane. These techniques can be used to produce antennas that fit within the tight confines of a handheld device.

Although compact antennas may be formed that are suitable for mounting within the interior of a handheld electronic device, such antennas may be subject to proximity effects. For example, if a user places their fingers over the antenna, the antenna may be detuned. This can cause undesirable dropped signals.

It would therefore be desirable to provide handheld electronic devices that can determine when antennas are blocked by a user's hand and can take appropriate actions.

SUMMARY

Handheld electronic devices and wireless communications circuitry for handheld electronic devices are provided. The wireless communications circuitry may include transceiver circuitry and one or more antennas. The transceiver circuitry may be used to transmit and receive radio-frequency signals through a coupler and an antenna.

A reflected power detection circuit may be connected to one port of the coupler. When signals are transmitted from the transceiver through the coupler and the antenna, a portion of the transmitted signals are reflected back from the antenna into the coupler.

When a user touches the handheld electronic device in the vicinity of the antenna, the antenna may be detuned due to proximity effects. This disrupts normal operation of the antenna and increases the amount of reflected signal power.

The coupler directs the reflected radio-frequency signals from the antenna into the reflected power detection circuit. The reflected power detection circuit may convert the reflected radio-frequency signals from the coupler into an analog reflected power signal. An analog to digital converter may be used to convert the analog reflected power signal into a digital reflected power signal.

Processing circuitry may be used to compare the reflected power signal to a threshold level. If the processing circuitry determines that the reflected power signal is relatively low, no action need be taken. If, however, the processing circuitry determines that the reflected power signal is relatively high, the processing circuitry can take appropriate action.

For example, the processing circuitry can issue an alert for the user of the handheld electronic device. The alert may be provided in visual form, in the form of an audio message, or as a vibrating alert. With one suitable arrangement, the handheld electronic device has a display on which a wireless signal strength indicator is displayed. When reflected power monitoring and control circuitry in the handheld electronic device determines that operation of the antenna is being disrupted due to proximity effects, an alert symbol may be displayed over the signal strength indicator.

If desired, the handheld electronic device may take other suitable actions when it is determined that antenna operation has been disrupted by proximity effects. For example, the handheld electronic device may chose to use a different (unblocked) antenna or may turn off portions of the device to save power.

Further features of the invention, its nature and various advantages will be more apparent from the accompanying drawings and the following detailed description of the preferred embodiments.

DETAILED DESCRIPTION

The present invention relates generally to wireless communications, and more particularly, to wireless electronic devices with reflected antenna signal monitoring capabilities.

The wireless electronic devices may be portable electronic devices such as laptop computers or small portable computers of the type that are sometimes referred to as ultraportables. Portable electronic devices may also be somewhat smaller devices. Examples of smaller portable electronic devices include wrist-watch devices, pendant devices, headphone and earpiece devices, and other wearable and miniature devices. With one suitable arrangement, which is sometimes described herein as an example, the portable electronic devices are handheld electronic devices.

The handheld devices may be, for example, cellular telephones, media players with wireless communications capabilities, handheld computers (also sometimes called personal digital assistants), remote controllers, global positioning system (GPS) devices, and handheld gaming devices. The handheld devices may also be hybrid devices that combine the functionality of multiple conventional devices. Examples of hybrid handheld devices include a cellular telephone that includes media player functionality, a gaming device that includes a wireless communications capability, a cellular telephone that includes game and email functions, and a handheld device that receives email, supports mobile telephone calls, has music player functionality and supports web browsing. These are merely illustrative examples.

Figure 1:
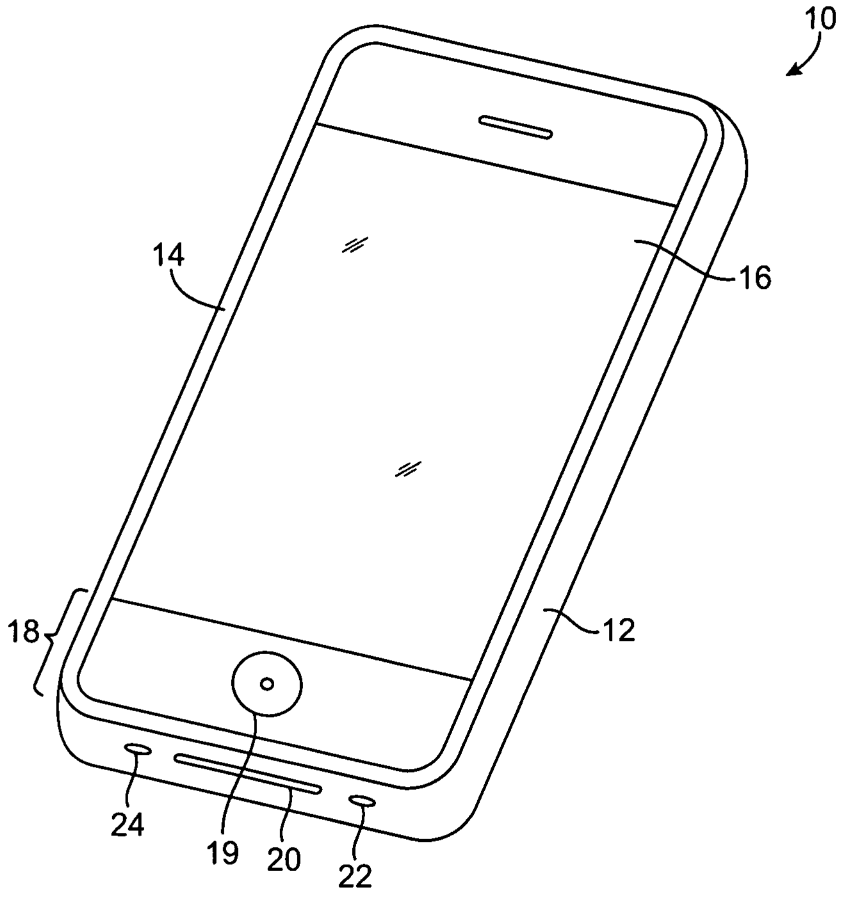
FIG. 1 is a perspective view of an illustrative handheld electronic device with an antenna in accordance with an embodiment of the present invention.

An illustrative handheld electronic device in accordance with an embodiment of the present invention is shown in FIG. 1. Device 10 may be any suitable portable or handheld electronic device.

Device 10 may have housing 12. Device 10 may include one or more antennas for handling wireless communications.

Device 10 may handle communications over one or more communications bands. For example, wireless communications circuitry in device 10 may be used to handle cellular telephone communications in one or more frequency bands and data communications in one or more communications bands. Typical data communications bands that may be handled by the wireless communications circuitry in device 10 include the 2.4 GHz band that is sometimes used for WiFi® and Bluetooth® communications, the 5 GHz band that is sometimes used for WiFi communications, the 1575 MHz Global Positioning System band, and 3G data bands (e.g., the UMTS band at 1920-2170). Each band may be handled by a separate antenna or one or more antennas may be used each of which handles one or more separate communications bands.

Housing 12, which is sometimes referred to as a case, may be formed of any suitable materials including, plastic, glass, ceramics, metal, or other suitable materials, or a combination of these materials. In some situations, housing 12 or portions of housing 12 may be formed from a dielectric or other low-conductivity material, so that the operation of conductive antenna elements that are located in proximity to housing 12 is not disrupted by the housing. Housing 12 or portions of housing 12 may also be formed from conductive materials such as metal. An illustrative housing material that may be used is anodized aluminum. Aluminum is relatively light in weight and, when anodized, has an attractive insulating and scratch-resistant surface. If desired, other metals can be used for the housing of device 10, such as stainless steel, magnesium, titanium, alloys of these metals and other metals, etc. In scenarios in which housing 12 is formed from metal elements, one or more of the metal elements may be used as part of the antenna in device 10. For example, metal portions of housing 12 may be shorted to an internal ground plane in device 10 to create a larger ground plane element for that device 10. To facilitate electrical contact between an anodized aluminum housing and other metal components in device 10, portions of the anodized surface layer of the anodized aluminum housing may be selectively removed during the manufacturing process (e.g., by laser etching).

Housing 12 may have a bezel 14 that holds a display or other device with a planar surface in place on device 10. The bezel 14 may be formed from a conductive material such as stainless steel.

Display 16 may be a liquid crystal diode (LCD) display, an organic light emitting diode (OLED) display, a plasma display, or any other suitable display. The outermost surface of display 16 may be formed from one or more plastic or glass layers. If desired, touch screen functionality may be integrated into display 16 or may be provided using a separate touch pad device. An advantage of integrating a touch screen into display 16 to make display 16 touch sensitive is that this type of arrangement can save space and reduce visual clutter.

In the example of FIG. 1, display screen 16 is shown as being mounted on the front face of handheld electronic device 10, but display screen 16 may, if desired, be mounted on the rear face of handheld electronic device 10, on a side of device 10, on a flip-up portion of device 10 that is attached to a main body portion of device 10 by a hinge (for example), or using any other suitable mounting arrangement.

A touch sensitive display is merely one example of an input-output device that may be used with handheld electronic device 10. If desired, handheld electronic device 10 may have other input-output devices. For example, handheld electronic device 10 may have user input control devices such as button 19, and input-output components such as port 20 and one or more input-output jacks (e.g., for audio and/or video). Button 19 may be, for example, a menu button. Port 20 may contain a 30-pin data connector (as an example). Openings 24 and 22 may, if desired, form microphone and speaker ports. Audio output may be provided by a speaker located adjacent to a speaker port, by a buzzer or other tone generator, or any other suitable audio output device. A vibrating element may be used to produce vibrations that alert a user. Different patterns and types of vibrations may be used for different types of alerts.

A user of handheld device 10 may supply input commands using user input interface devices such as button 19 and touch screen 16. Suitable user input interface devices for handheld electronic device 10 include buttons (e.g., alphanumeric keys, power on-off, power-on, power-off, and other specialized buttons, etc.), a touch pad, pointing stick, or other cursor control device, a microphone for supplying voice commands, or any other suitable interface for controlling device 10. Although shown schematically as being formed on the front face of handheld electronic device 10 in the example of FIG.

1, buttons such as button 19 and other user input interface devices may generally be formed on any suitable portion of handheld electronic device 10. For example, a button such as button 19 or other user interface control may be formed on the side of handheld electronic device 10. Buttons and other user interface controls can also be located on the front face, rear face, or other portion of device 10. If desired, device 10 can be controlled remotely (e.g., using an infrared remote control, a radio-frequency remote control such as a Bluetooth remote control, etc.).

Handheld device 10 may have ports such as port 20. Port 20, which may sometimes be referred to as a dock connector, 30-pin data port connector, input-output port, or bus connector, may be used as an input-output port (e.g., when connecting device 10 to a mating dock connected to a computer or other electronic device). Device 10 may also have audio and video jacks that allow device 10 to interface with external components. Typical ports include power jacks to recharge a battery within device 10 or to operate device 10 from a direct current (DC) power supply, data ports to exchange data with external components such as a personal computer or peripheral, audio-visual jacks to drive headphones, a monitor, or other external audio-video equipment, a subscriber identity module (SIM) card port to authorize cellular telephone service, a memory card slot, etc. The functions of some or all of these devices and the internal circuitry of handheld electronic device 10 can be controlled using input interface devices such as touch screen display 16.

Components such as display 16 and other user input interface devices may cover most of the available surface area on the front face of device 10 (as shown in the example of FIG. 1) or may occupy only a small portion of the front face of device 10. Because electronic components such as display 16 often contain large amounts of metal (e.g., as radio-frequency shielding), it may be desirable to take the location of these components relative to the antenna elements into consideration. Suitably chosen locations for the antenna elements and electronic components of the device will allow the antennas of handheld electronic device 10 to function properly without being disrupted by the electronic components.

With one suitable arrangement, the antenna resonating element structures of device 10 are located in the lower end 18 of device 10, in the proximity of port 20. An advantage of locating antenna resonating element structures in the lower portion of housing 12 and device 10 is that this places radiating portions of the antenna structures away from the user's head when the device 10 is held to the head (e.g., when talking into a microphone and listening to a speaker in the handheld device as with a cellular telephone). In general, antenna(s) for device 10 may be located in any suitable portion of housing 12. Placement of antenna structures in location 18 is merely illustrative.

Figure 2:
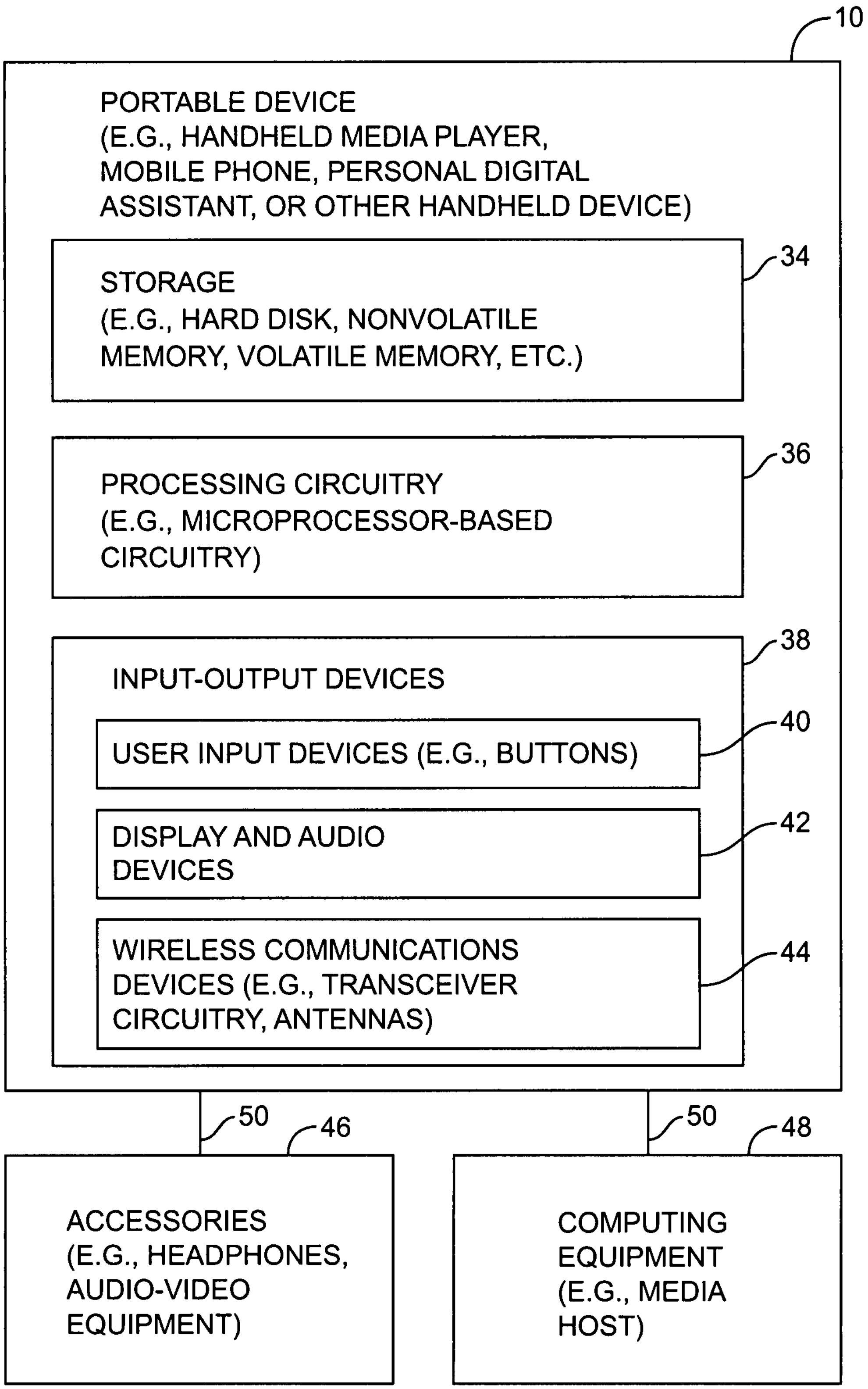
FIG. 2 is a schematic diagram of an illustrative handheld electronic device with an antenna in accordance with an embodiment of the present invention.

A schematic diagram of an embodiment of an illustrative handheld electronic device is shown in FIG. 2. Handheld device 10 may be a mobile telephone, a mobile telephone with media player capabilities, a handheld computer, a remote control, a game player, a global positioning system (GPS) device, a combination of such devices, or any other suitable portable electronic device.

As shown in FIG. 2, handheld device 10 may include storage 34. Storage 34 may include one or more different types of storage such as hard disk drive storage, nonvolatile memory (e.g., flash memory or other electrically-programmable-read-only memory), volatile memory (e.g., battery-based static or dynamic random-access-memory), etc.

Processing circuitry 36 may be used to control the operation of device 10. Processing circuitry 36 may be based on a processor such as a microprocessor and other suitable integrated circuits. With one suitable arrangement, processing circuitry 36 and storage 34 are used to run software on device 10, such as internet browsing applications, voice-over-internet-protocol (VOIP) telephone call applications, email applications, media playback applications, operating system functions, etc. Processing circuitry 36 and storage 34 may be used in implementing suitable communications protocols. Communications protocols that may be implemented using processing circuitry 36 and storage 34 include internet protocols, wireless local area network protocols (e.g., IEEE 802.11 protocols—sometimes referred to as WiFi®), protocols for other short-range wireless communications links such as the Bluetooth® protocol, protocols for handling 3g data services such as UMTS, cellular telephone communications protocols, etc.

Input-output devices 38 may be used to allow data to be supplied to device 10 and to allow data to be provided from device 10 to external devices. Display screen 16, button 19, microphone port 24, speaker port 22, and dock connector port 20 are examples of input-output devices 38.

Input-output devices 38 can include user input-output devices 40 such as buttons, touch screens, joysticks, click wheels, scrolling wheels, touch pads, key pads, keyboards, microphones, cameras, speakers, tone generators, vibrating elements, etc. A user can control the operation of device 10 by supplying commands through user input devices 40. Display and audio devices 42 may include liquid-crystal display (LCD) screens or other screens, light-emitting diodes (LEDs), and other components that present visual information and status data. Display and audio devices 42 may also include audio equipment such as speakers and other devices for creating sound. Display and audio devices 42 may contain audio-video interface equipment such as jacks and other connectors for external headphones and monitors.

Wireless communications devices 44 may include communications circuitry such as radio-frequency (RF) transceiver circuitry formed from one or more integrated circuits, power amplifier circuitry, passive RF components, one or more antennas, and other circuitry for handling RF wireless signals. Wireless signals can also be sent using light (e.g., using infrared communications).

Device 10 can communicate with external devices such as accessories 46 and computing equipment 48, as shown by paths 50. Paths 50 may include wired and wireless paths. Accessories 46 may include headphones (e.g., a wireless cellular headset or audio headphones) and audio-video equipment (e.g., wireless speakers, a game controller, or other equipment that receives and plays audio and video content).

Computing equipment 48 may be any suitable computer. With one suitable arrangement, computing equipment 48 is a computer that has an associated wireless access point (router) or an internal or external wireless card that establishes a wireless connection with device 10. The computer may be a server (e.g., an internet server), a local area network computer with or without internet access, a user's own personal computer, a peer device (e.g., another handheld electronic device 10), or any other suitable computing equipment.

The antenna structures and wireless communications devices of device 10 may support communications over any suitable wireless communications bands. For example, wireless communications devices 44 may be used to cover communications frequency bands such as the cellular telephone bands at 850 MHz, 900 MHz, 1800 MHz, and 1900 MHz, data service bands such as the 3 G data communications band at 2170 MHz band (commonly referred to as UMTS or Universal Mobile Telecommunications System), the WiFi® (IEEE 802.11) bands at 2.4 GHz and 5.0 GHz (also sometimes referred to as wireless local area network or WLAN bands), the Bluetooth® band at 2.4 GHz, and the global positioning system (GPS) band at 1575 MHz. The 850 MHz band is sometimes referred to as the Global System for Mobile (GSM) communications band. The 900 MHz communications band is sometimes referred to as the Extended GSM (EGSM) band. The 1800 MHz band is sometimes referred to as the Digital Cellular System (DCS) band. The 1900 MHz band is sometimes referred to as the Personal Communications Service (PCS) band.

Device 10 can cover these communications bands and/or other suitable communications bands with proper configuration of the antenna structures in wireless communications circuitry 44.

Figure 3:
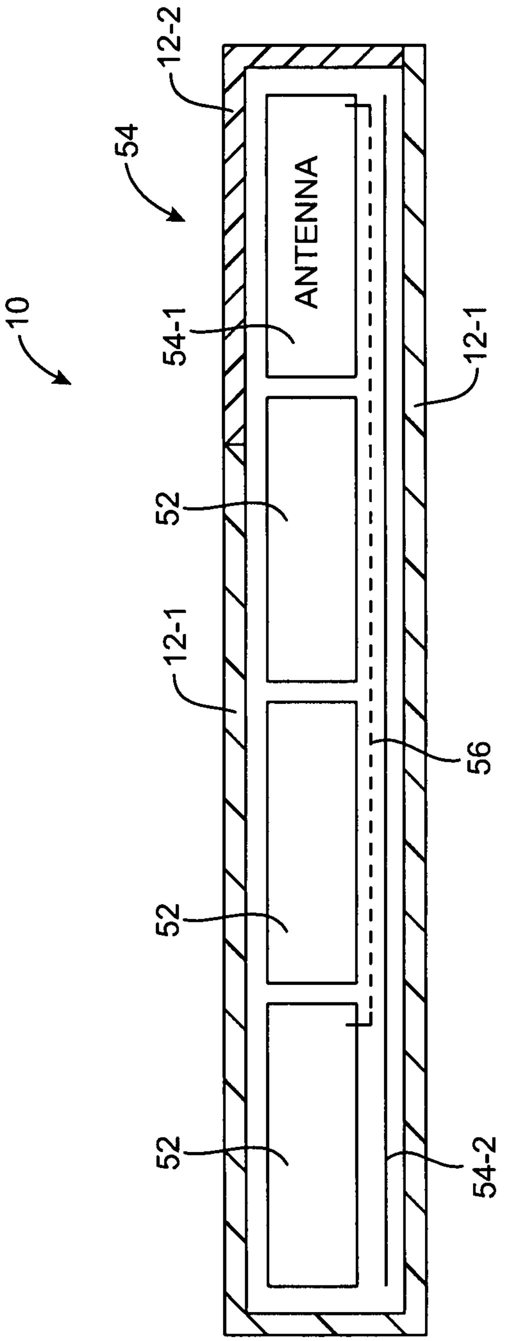
FIG. 3 is a cross-sectional side view of an illustrative handheld electronic device with an antenna in accordance with an embodiment of the present invention.

A cross-sectional view of an illustrative handheld electronic device is shown in FIG. 3. In the example of FIG. 3, device 10 has a housing that is formed of a conductive portion 12-1 and a plastic portion 12-2. Conductive portion 12-1 may be any suitable conductor such as aluminum, magnesium, stainless steel, alloys of these metals and other metals, etc.

Housing portion 12-2 may be formed from a dielectric. An advantage of using dielectric for housing portion 12-2 is that this allows a resonating element portion 54-1 of antenna 54 of device 10 to operate without interference from the metal sidewalls of housing 12. With one suitable arrangement, housing portion 12-2 is a plastic cap formed from a plastic based on acrylonitrile-butadiene-styrene copolymers (sometimes referred to as ABS plastic). These are merely illustrative housing materials for device 10. For example, the housing of device 10 may be formed substantially from plastic or other dielectrics, substantially from metal or other conductors, or from any other suitable materials or combinations of materials. Antenna resonating element 54-1 may be formed using any suitable antenna resonating element structure (e.g., a strip of conductor that forms a monopole antenna, a planar inverted-F resonating element structure, structures with multiple antenna resonating element branches, etc.).

Components such as components 52 may be mounted on circuit boards in device 10. The circuit board structures in device 10 may be formed from any suitable materials. Suitable circuit board materials include paper impregnated with phonolic resin, resins reinforced with glass fibers such as fiberglass mat impregnated with epoxy resin (sometimes referred to as FR-4), plastics, polytetrafluoroethylene, polystyrene, polyimide, and ceramics. Circuit boards fabricated from materials such as FR-4 are commonly available, are not cost-prohibitive, and can be fabricated with multiple layers of metal (e.g., four layers). So-called flex circuits, which are flexible circuit board materials such as polyimide, may also be used in device 10.

Typical components in device 10 include integrated circuits, LCD screens, and user input interface buttons. Device 10 also typically includes a battery, which may be mounted along the rear face of housing 12 (as an example).

Because of the conductive nature of components such as these and the printed circuit boards upon which these components are mounted, the components, circuit boards, and conductive housing portions including optional bezel 14 of device 10 may be grounded together to form an antenna ground plane 54-2. With one illustrative arrangement, ground plane 54-2 may conform to the generally rectangular shape of housing 12 and device 10 and may match the rectangular lateral dimensions of housing 12.

Ground plane element 54-2 and antenna resonating element 54-1 form antenna 54 for device 10. If desired, other antennas can be provided for device 10 in addition to antenna 54 of FIG. 3. Such additional antennas may, if desired, be configured to provide additional gain for an overlapping frequency band of interest (i.e., a band at which antenna 54 is operating) or may be used to provide coverage in a different frequency band of interest (i.e., a band outside of the range of antenna 54).

Any suitable conductive materials may be used to form ground plane element 54-2 and resonating element 54-1 in antenna 54. Examples of suitable conductive materials for antenna 54 include metals, such as copper, brass, silver, and gold. Conductors other than metals may also be used, if desired. In a typical scenario, the conductive structures for resonating element 54-1 are formed from copper traces on a flex circuit or other suitable substrate.

Components 52 include transceiver circuitry (see, e.g., devices 44 of FIG. 2). The transceiver circuitry may be provided in the form of one or more integrated circuits and associated discrete components (e.g., filtering components). Transceiver circuitry may include one or more transmitter integrated circuits, one or more receiver integrated circuits, switching circuitry, amplifiers, etc. Each transceiver in transceiver circuitry may have an associated coaxial cable or other transmission line that is connected to antenna 54 and over which radio frequency signals are conveyed. In the example of FIG. 3, a transmission line is depicted by dashed line 56.

As shown in FIG. 3, transmission line 56 may be used to distribute radio-frequency signals that are to be transmitted through an antenna such as antenna 54 from a transmitter integrated circuit and other suitable wireless circuitry to the antenna. Paths such as path 56 may also be used to convey radio-frequency signals that have been received by an antenna such as antenna 54 to components 52. A receiver integrated circuit or other transceiver circuitry may be used to process incoming radio-frequency signals that have been conveyed from an antenna over one or more transmission lines.

In the example of FIG. 3, antenna 54 is located at the lower end of device 10. This is merely illustrative. Examples of antenna arrangements in which antennas are formed at different locations within a device are shown in the top (front) views of FIGS. 4, 5, 6, 7, 8, and 9. In these examples, device 10 is shown in a portrait orientation. If desired, device 10 may be used in a landscape orientation (rotated 90° relative to the portrait orientation) or may be used in both portrait and landscape orientations (e.g., in different modes of operation).

Figure 4:
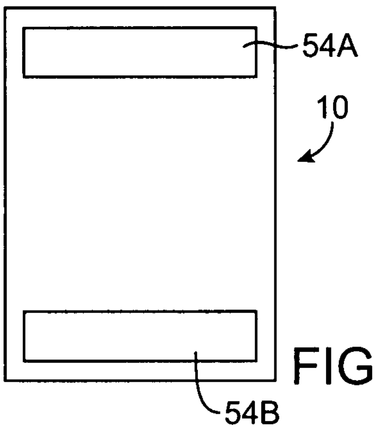
FIGS. 4, 5, 6, 7, 8, and 9 are views of the front of an illustrative handheld electronic device showing examples of suitable antenna resonating element positions within the device in accordance with embodiment of the present invention.

FIG. 4 shows an example in which antennas 54A and 54B are formed at opposite ends of device 10. Antennas 54A and 54B may be located at the top and bottom of device 10 when viewing its display 16 in a portrait orientation (as an example).

Figure 5:
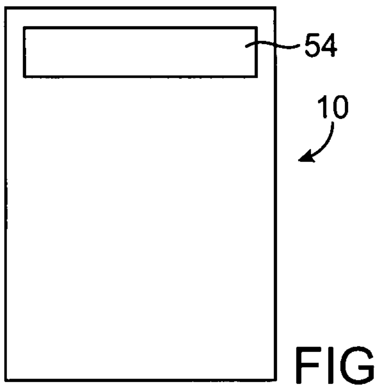

The illustrative arrangement of FIG. 5 shows how antenna 54 may be located at the top of device 10.

Figure 6:
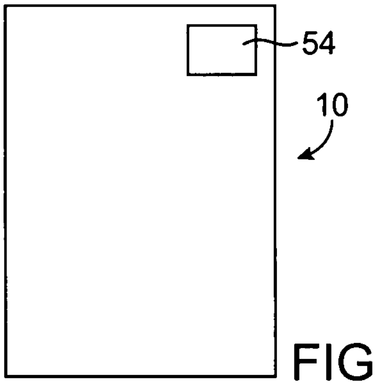

Antenna 54 may have any suitable size or shape. For example, antenna 54 may be compact enough to be located in a corner of device 10. As shown in FIG. 6, antenna 54 may be located in the upper right corner of device 10.

Figure 7:
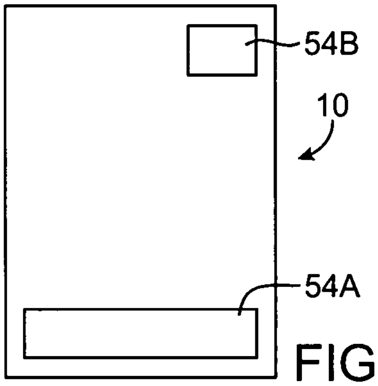

In the example of FIG. 7, there are two antennas of different sizes. Antenna 54A extends across the width of the lower portion of device 10. Antenna 54B is located in the upper right corner of device 10.

Figure 8:
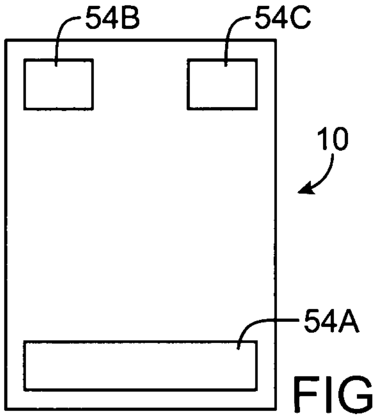

As shown in FIG. 8, there may be more than two antennas in device 10. These antennas may be located at different corners or ends of device 10 to minimize interference with each other. In the example of FIG. 8, antenna 54A extends across substantially all of the width of device 10, whereas antennas 54B and 54C are compact enough to be located in different corners of device 10. If desired, multiple antennas in device 10 may be located adjacent to each other.

Figure 9:
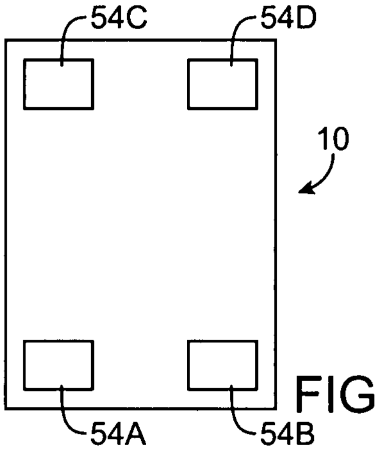

An example in which there are four antennas in device 10 is shown in FIG. 9. In the example of FIG. 9, antenna 54A is located in the lower left corner, antenna 54B is located in the lower right corner, antenna 54C is located in the upper left corner, and antenna 54D is located in the upper right corner.

In embodiments of device 10 that have multiple antennas (e.g., embodiments such as the embodiments of FIGS. 4, 7, 8, and 9 or other suitable multiple antenna arrangements), the multiple antennas may be used to expand the frequency coverage of device 10. For example, an antenna may be used to provide frequency coverage for a communications band that would not otherwise be covered by the other antennas in device 10. Additional antenna structures may also be used to provide more sensitivity for an existing band. For example, device 10 may have an antenna that provides expanded coverage by overlapping and reinforcing an existing frequency band o interest.

If desired, multiple antennas may be used to provide redundancy. For example, two or more antennas in device 10 may be used to implement an antenna diversity arrangement. In this type of scheme, multiple antennas are used to cover the same communications band. If a given one of the antennas is performing poorly, the handheld electronic device may automatically detect this condition and may switch to another antenna that is covering the same band.

In some handheld device arrangements, it may be desired to minimize the amount of space consumed by antenna structures. In these configurations, it may be desirable to minimize the use of redundant antennas.

Handheld electronic devices such as device 10 are often touched by a user. For example, a device 10 may be held in the hand of a user and placed against the side of a user's head when the user is making a cellular telephone call. As another example, a user may hold either end of device 10 in the user's fingers when the user is operating device 10 in a landscape orientation. In other situations, the user may hold or touch device 10 using other parts of the body. The user may also place device 10 adjacent to metal objects (e.g., when placing device 10 on a countertop, etc.).

In each of these environments, there is a potential for one or more of the antennas to become partially or completely blocked. For example, incoming and outgoing radio-frequency communications may be disrupted because the user's hand or other body part or other items are placed in close proximity to the antenna. This may detune the antenna by causing its resonance peak to shift away from its desired frequency or may otherwise disrupt antenna operations. Antenna disruptions that are caused by the user placing a body part or other item in the vicinity of the antenna are sometimes referred to as being caused by proximity effects.

Antenna blockages can cause difficulties for a user of a handheld electronic device. For example, if a user holds the device in an inappropriate fashion or places the device in an environment in which proper antenna operations are disrupted, a cellular telephone call may be disrupted or a data transfer operation may be disrupted.

To avoid problems such as these, handheld electronic device 10 may be provided with monitoring and control circuitry that monitors the antennas in the device. If it is determined that wireless signals are not being handled properly, suitable actions may be taken.

For example, the user of a device may be warned that one or more of the antennas in the device is not operating properly. The warning may be provided using an audio alert (e.g., a warning tone or audio clip warning), a visual alert (e.g., by lighting an indicator, by displaying a textual or symbolic warning message for the user, etc.), by touch (e.g., by turning on a vibrating element within the device), using other suitable input-output arrangements, or by using a combination of such approaches.

The wireless circuitry of device 10 may also switch to a different antenna (i.e., when multiple antennas are available that can communicate in the communications band of interest), may adjust the transmitted signal power, may adjust the input gain, etc.

Combinations of alert message actions and antenna adjustment actions may also be taken.

Any suitable antenna monitoring and control circuitry arrangement may be used in device 10. For example, incoming signal strength can be monitored by analyzing incoming data (e.g., to determine how many data errors are present or to otherwise ascertain the quality of the signal).

With one particularly suitable arrangement, which is described herein as an example, device 10 may use a radio-frequency signal coupler to monitor the amount of outgoing signal power that is reflected back from the antenna. When there is no significant antenna blockage, signals will be transmitted efficiently and the amount of reflected power will be low. In this situation, device 10 can be operated normally. When a user places a body part or other object in close proximity to an antenna, the normal operation of the antenna may be disrupted due to proximity effects. When antenna operations are disrupted due to proximity effects, radio-frequency signals will not be transmitted efficiently and the amount of signal power that is reflected from the antenna will increase. Because observations of high levels of reflected signal power are indicative of antenna blockage, the user can be warned that the antenna is being blocked or other suitable actions can be taken.

Figure 10:
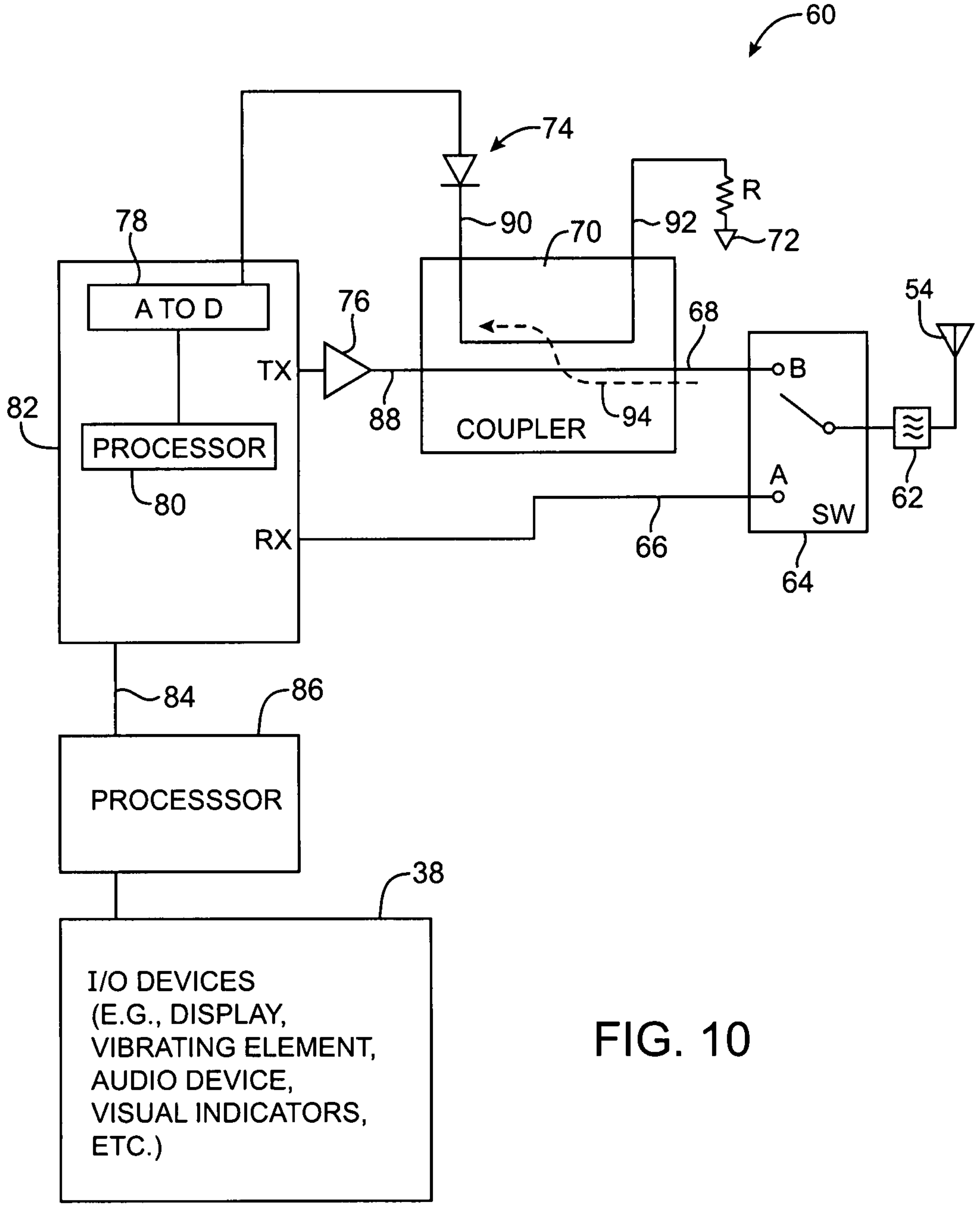
FIG. 10 is a schematic circuit diagram of monitoring and control circuitry in a handheld electronic device in accordance with an embodiment of the present invention.

Illustrative monitoring and control circuitry 60 that may be used in device 10 is shown in FIG. 10. Transceiver circuitry such as transceiver circuitry 82 may be used to transmit and receive radio-frequency communications signals. Transceiver circuitry 82 may be based on one or more transceiver integrated circuits. Outgoing signals for antenna 54 may be transmitted through transmit port TX. Incoming signals from antenna 54 may be received at receive port RX.

Transceiver circuitry 82 may be coupled to antenna 54 using any suitable arrangement. As shown in the illustrative configuration of FIG. 10, a switch such as switch 64 may be used to selectively connect transceiver circuitry 82 to antenna 54 through radio-frequency filter 62. Filter 62 may be, for example, a bandpass filter.

The state of switch 64 may be controlled by control signals generated by transceiver circuitry 82 or other control logic. When it is desired to receive signals from antenna 54, switch 64 may be placed in position A. In position A, signals that are received from antenna 54 are directed to the RX port of transceiver circuitry 82 via path 66. When it is desired to transmit signals through antenna 54, switching circuitry 64 may be placed in position B. In this configuration, signals from the TX port of transceiver circuitry 82 are routed to antenna 54 through power amplifier 76, coupler 70, and switch 64.

Power detection circuit 74 may be used to detect reflected power from antenna 74. In the example of FIG. 10, power detection circuit 74 is formed using a diode that converts reflected radio-frequency signals into a direct current (DC) analog signal that may be digitized by analog to digital converter 78 of transceiver circuitry 82. This is, however, merely illustrative. Any suitable detection circuitry may be used to monitor reflected radio-frequency signal power if desired.

Coupler 70 may have four ports. A first port may be connected to the TX port of transceiver circuitry 82 via path 88 and power amplifier 76. A second port may be coupled to switch terminal B via path 68. A third port may be coupled to power detection circuit 74 using path 90. A fourth port may be coupled to termination resistor R and ground terminal 72 via path 92.

During operation of the transmitter circuitry in transceiver circuitry 82, a fraction of the transmitted signal power is reflected back from antenna 54 into coupler 70. As shown by dotted line 94, these reflected signals are directed to power detection circuit 74 through the third port of coupler 70.

Although shown separately in FIG. 10, components such as transceiver circuitry 82, power amplifier 76, coupler 70, switch 64, filter 62, and antenna 54 can be implemented using integrated components, if desired. For example, components such as reflected signal power detection circuit 74, coupler 70, and switch 64 may be provided using one or more integrated devices.

Transceiver circuitry 82 may have a processor such as processor 80 that receives digital signals from analog to digital converter circuit 78. The output of power monitoring circuit 74 may be an analog signal that represents the amount of power that has been reflected back from antenna 54 during data transmission operations. Analog to digital converter 78 may be used to digitize this monitored reflected power level. Processor 80 may be used to digitally process the digital signal data. Processor 80 may, if desired, analyze the reflected signal data to determine when the operation of antenna 54 has been disrupted. When operation has been disrupted, processor 80 may determine a suitable course of action.

If desired, processor 80 may work in conjunction with additional processing circuitry in device 10. As shown FIG. 10, for example, processor 80 may communicate with an external processor such as processor 86 via path 84. Path 84 may be any suitable data communications path (e.g., serial data path, a parallel data path, a path involving a single conductive line, a path involving parallel data lines, etc.). Processor 86 may be, for example, the main microprocessor contained in handheld electronic device 10. Processing circuitry such as processor 80 and/or processor 86 may be used to monitor the measured reflected power from detector circuit 74 and may be used to control the operation of device 10.

Processing circuitry such as processors 80 and 86 may analyze the reflected power signal by comparing the measured signal to a threshold or performing other suitable processing operations. There may be one threshold associated with the monitored reflected power so that the reflected power may be characterized as being high or low, or there may be multiple thresholds or ranges that are associated with the measured reflected power. More complex comparisons (e.g., comparisons involving the current state of device 10 or trend information) may also be made. These are merely illustrative examples. Any suitable type of signal analysis may be performed on the measured reflected antenna signal power if desired.

In a typical scenario, which is sometimes described herein as an example, reflected signals that are below a given threshold are characterized as being "low" or "normal," whereas signals that are above the given threshold are characterized as being "high" or "abnormal." With this type of arrangement, device 10 can conclude that normal antenna operation has been achieved whenever the amount of signal that is reflected from the antenna during transmission operations is below the threshold. Whenever the reflected signal exceeds the threshold, device 10 can conclude that normal antenna operation has been disrupted due to proximity effects and can take appropriate actions.

As shown in FIG. 10, processor 86 may communicate with input-output devices 38. Processing circuitry such as processor 80 and/or processor 86 may be used to control devices such as devices 38 to take appropriate actions when a high amount of reflected power is detected from detection circuit 74. For example, processor 86 may use I/O devices 38 to issue alerts. Alert messages and other suitable messages may be presented to users using a display, a vibrating device, an audio device (e.g., a speaker or a tone generator), a light emitting diode or other indicator lights, etc.

If desired, processing circuitry such as processor 80 and/or processor 86 may take other suitable actions when a high amount of reflected power is detected. For example, the processing circuitry may assume that the high amount of reflected power is indicative of such poor antenna performance that transceiver circuitry 82 should be shut off to conserve power. As another example, the processing circuitry may assume that a user has picked up device 10. In this scenario, the reflected power signal monitoring circuitry is being used to form a touch sensor. Other suitable actions include increasing output power to compensate for antenna detuning (e.g., by increasing the gain of power amplifier 76) or increasing receiver sensitivity (e.g., by increasing the gain of an amplifier in the input path).

Figure 11:
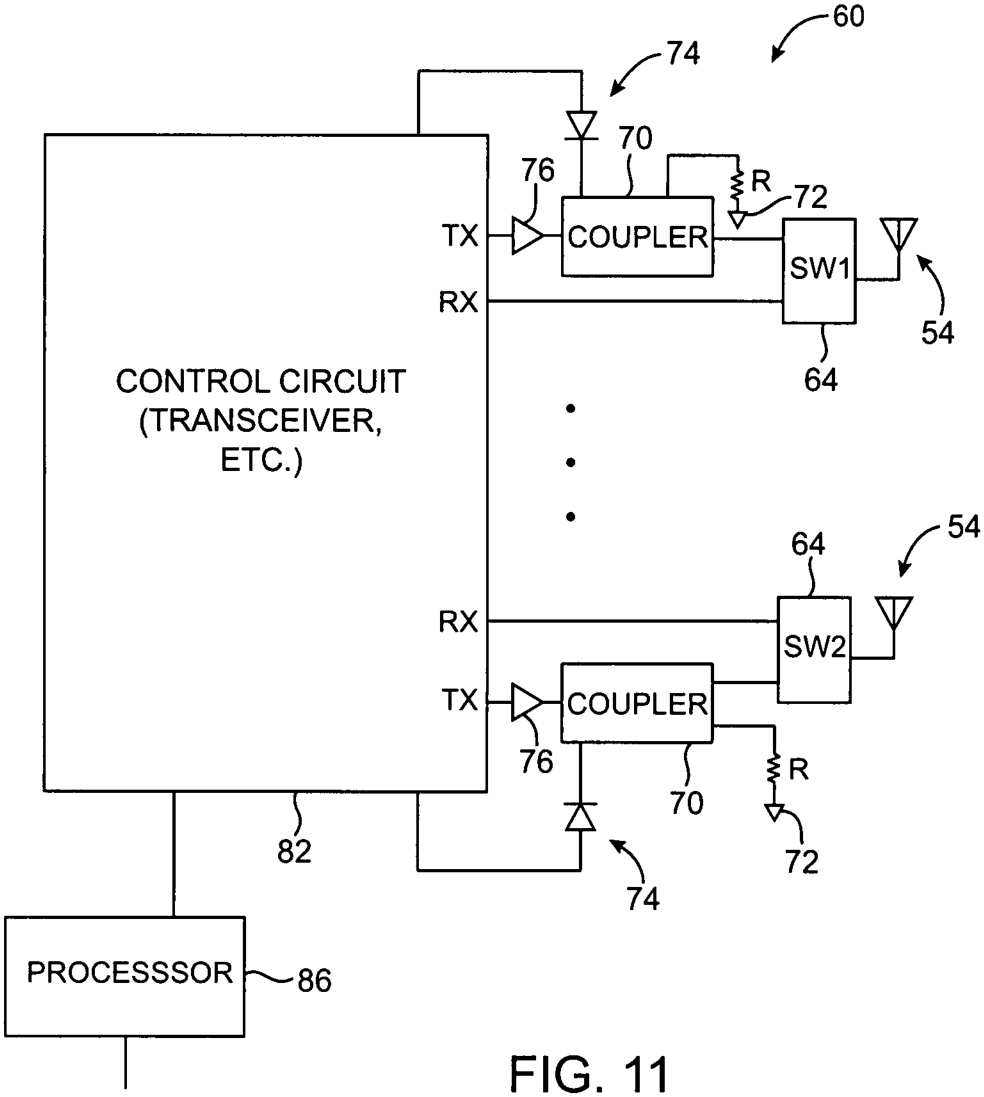
FIG. 11 is a schematic circuit diagram of illustrative control and monitoring circuitry that may be used to handle multiple antennas in a handheld electronic device in accordance with an embodiment of the present invention.

When redundant antenna circuitry is available, the processing circuitry on device 10 may switch between different antennas. An arrangement in which device 10 has monitoring and control circuitry 60 that handles multiple redundant antennas 54 is shown in FIG. 11. In this type of configuration, each antenna 54 may cover the same communications band, but may be mounted in a different portion of the housing of device 10 to implement an antenna diversity scheme. If the processing circuitry that is associated with one antenna is disrupted, transceiver circuitry 82 may use a different antenna 54 to transmit and receive signals. As shown in FIG. 11, each antenna 54 may have an associated reflected power detection circuit 74. Components such as power amplifiers 76 may be provided for each redundant antenna 54 (as shown in the FIG. 11 example) or may be shared using switching circuitry.

Figure 12:
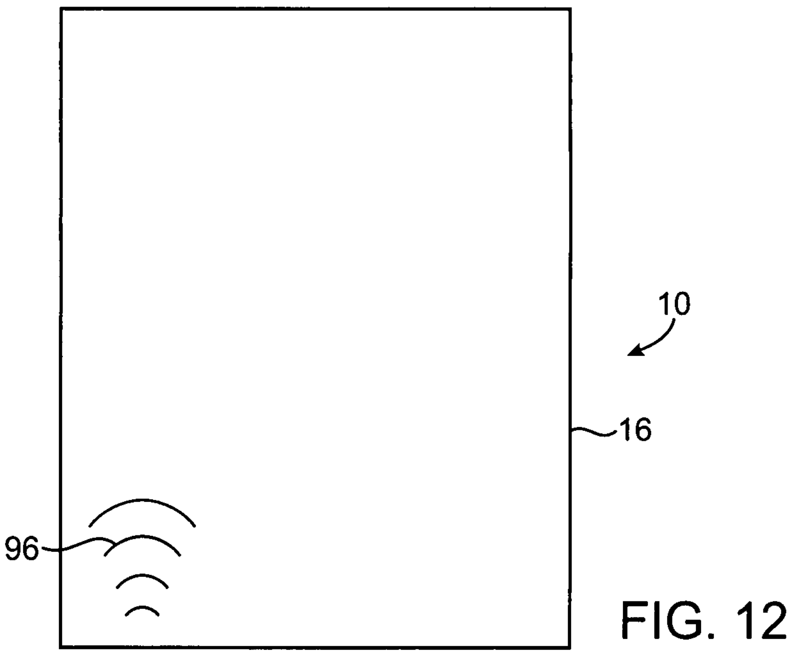
FIGS. 12 and 13 show how an illustrative signal strength warning indicator may be displayed for a user of a handheld electronic device in accordance with an embodiment of the present invention.

Device 10 may display a signal strength indicator for a user such as signal strength indicator 96 of FIG. 12. Signal strength indicators such as these may use lines, bars, numbers, or other suitable visual representations to indicate to a user the status of the current communications link between device 10 and the equipment with which device 10 is communicating. The link strength may, as an example, be derived from received signal error rate or power measurements. The signal strength may vary between zero (no signal) to a fixed value (e.g., "five bars").

Figure 13:
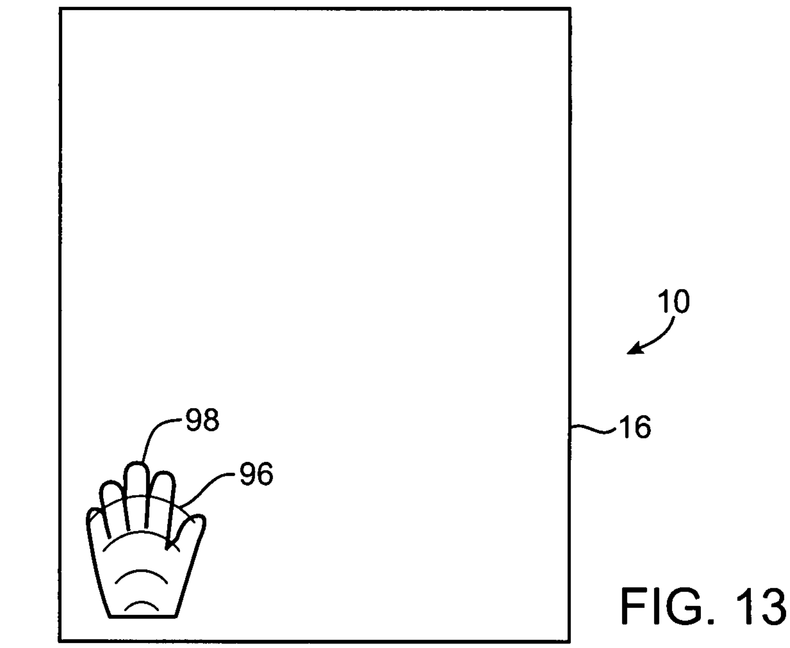

As shown in FIG. 13, when monitoring and control circuitry 60 detects that the reflected signal power is high, the processing circuitry of device 10 may use display 16 to display a blocked antenna indicator such as indicator 98. In the example of FIG. 13, indicator 98 has been provided in the form of a hand that is displayed over signal strength indicator 96. This visually indicates to the user that antenna operation is being disrupted by the presence of the user's hand or other body part. The user can remedy the situation by changing the way in which device 10 is being held. As soon as the antenna 54 is no longer being blocked by the user's touch, the visual warning provided by indicator 98 may be removed.

Figure 14:
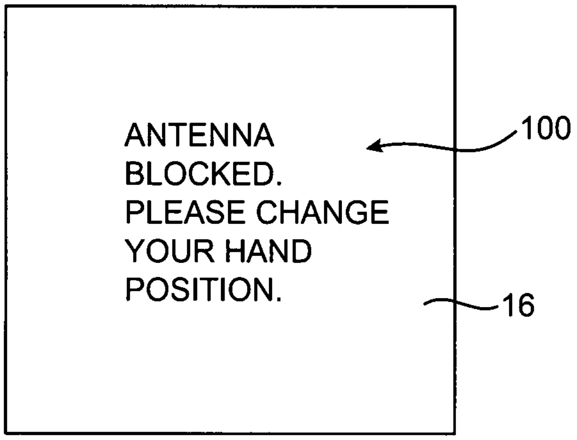
FIG. 14 shows an illustrative signal strength warning message that may be displayed for a user of a handheld electronic device in accordance with an embodiment of the present invention.

As shown in FIG. 14, an antenna blockage warning may be displayed in the form of a text alert on display 16. When a user reads message 100, the user is informed that the user's hand is covering the antenna. The user may take corrective action by holding device 10 in such a way that antenna operation is not disrupted. As soon as the monitored reflected antenna power reading drops below the threshold level, warning 100 may be removed. If desired, a confirmatory message may be displayed such as “antenna is working properly.”

Figure 15:
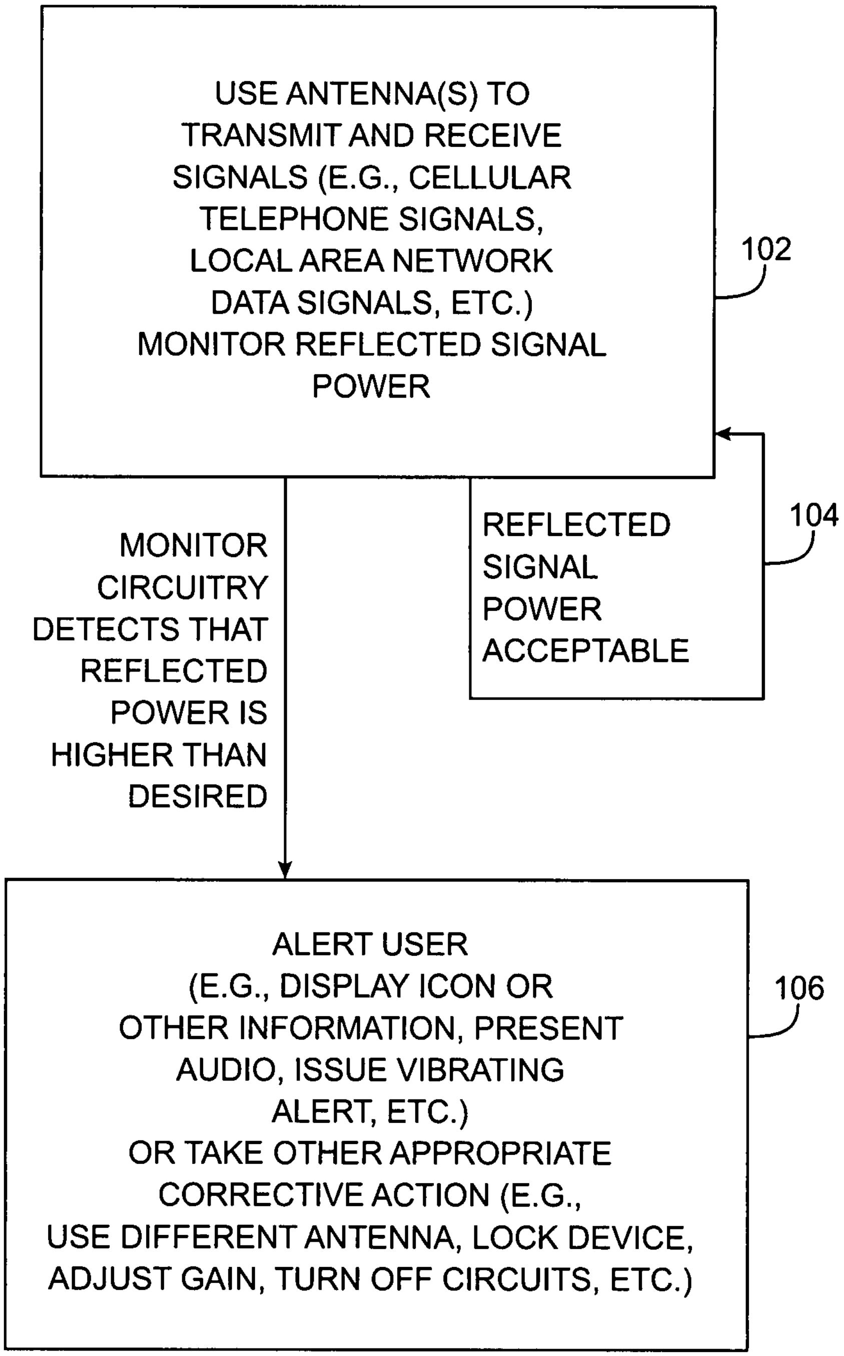
FIG. 15 is a flow chart of illustrative steps involved in using a handheld electronic device with wireless circuitry that includes antenna monitoring and control circuitry in accordance with an embodiment of the present invention.

Illustrative steps involved in monitoring antenna performance and taking associated actions are shown in FIG. 15. At step 102, a user of device 10 may use antenna(s) 54 to transmit and receive wireless radio-frequency signals. The signals may be associated with cellular telephone calls, incoming GPS signals, data signals for WiFi networks or Bluetooth links, long range data signals using data links such as 3 G communications links, etc.

During normal operation of device 10, the antenna structures (e.g., the antenna resonating elements) of device 10 should not be blocked by a user. If an antenna structure is covered by a user’s hand or is otherwise touched or obstructed by a body part of the user or by another item, antenna performance may be degraded due to proximity effects. When antenna performance is disrupted in this way, the antenna becomes detuned from its desired operating frequency. As a result, the amount of transmitted power that is reflected back through coupler 70 to power detection circuitry 74 is increased. The processing circuitry in device 10 can measure the amount of transmitted signal that is reflected back from antenna 54 to determine whether the antenna is operating properly. If the amount of reflected power is within normal operating limits, device 10 can conclude that the reflected signal power level is acceptable and can continue monitoring the reflected signal power without taking further actions (see, e.g., line 104 in FIG. 15).

If the amount of reflected power that is detected by the monitoring circuitry exceeds a user-defined or default threshold value or if device 10 otherwise concludes that the amount of reflected power is not appropriate, device 10 can take appropriate actions at step 106.

In general, any suitable actions or combinations of actions may be taken when a high amount of reflected power is detected at step 102. For example, a user may be alerted using a visual indicator (e.g., the warning image of FIG. 13). The user may also be alerted using other visual arrangements. The user may, as an example, be alerted by flashing a light emitting diode, by displaying a text message as described in connection with FIG. 14, by flashing the entire display or a portion of the display, by vibrating device 10 using a vibrating element, by issuing an audio alert in the form of a chime, bell, or other tone, by playing an audio clip (e.g., a warning clip), by using other suitable alerting schemes or a combination of these arrangements.

Other suitable corrective actions that may be taken include adjusting the input or output gain, switching to an antenna that is not blocked, shutting down transceiver circuitry 82 and/or other wireless communications circuitry to conserve power, locking device 10 (e.g., when using the reflected power feature as a touch sensor), otherwise changing the operation of device 10, etc.

Reflected power monitoring arrangements can be used in conjunction with other signal monitoring arrangements to improve accuracy or add functionality to device 10. For example, received signal strength can be monitored by evaluating the quality of the incoming signal (e.g., by evaluating its error rate, signal to noise ratio, power, etc.), while also measuring the amount of power that is reflected back from antenna 54 during signal transmission operations to assess whether the antenna is being adversely affected by proximity effects.

The foregoing is merely illustrative of the principles of this invention and various modifications can be made by those skilled in the art without departing from the scope and spirit of the invention.

What is claimed is:

1. A handheld electronic device comprising:
- an antenna;
- a radio-frequency coupler that is coupled to the antenna;
- transceiver circuitry that transmits and receives radio-frequency signals through the coupler and the antenna; and
- monitoring and control circuitry that monitors how much transmitted signal power is reflected back from the antenna when the transceiver circuitry is transmitting the radio-frequency signals, wherein the monitoring and control circuitry includes processing circuitry that analyzes the monitored reflected transmitted signal power and that alerts a user of the handheld electronic device when the monitored reflected transmitted signal power indicates that operation of the antenna is being disrupted due to proximity effects.

2. The handheld electronic device defined in claim 1 further comprising a display, wherein the processing circuitry displays a visual message to the user of the handheld electronic device on the display when the monitored reflected transmitted signal power indicates that operation of the antenna is being disrupted due to proximity effects.

3. The handheld electronic device defined in claim 1 further comprising a display, wherein the processing circuitry displays a visual alert symbol to the user of the handheld electronic device on the display when the monitored reflected transmitted signal power indicates that operation of the antenna is being disrupted due to proximity effects.

4. The handheld electronic device defined in claim 1 further comprising a display, wherein the processing circuitry displays alert message text to the user of the handheld electronic device on the display when the monitored reflected transmitted signal power indicates that operation of the antenna is being disrupted due to proximity effects.

5. The handheld electronic device defined in claim 1 further comprising a speaker, wherein the processing circuitry presents an audible alert to the user of the handheld electronic device with the speaker when the monitored reflected transmitted signal power indicates that operation of the antenna is being disrupted due to proximity effects.

6. The handheld electronic device defined in claim 1 further comprising a vibrating element, wherein the processing circuitry presents a vibrating alert to the user of the handheld electronic device with the vibrating element when the monitored reflected transmitted signal power indicates that operation of the antenna is being disrupted due to proximity effects.

7. The handheld electronic device defined in claim 1, wherein the processing circuitry shuts down communications circuitry on the handheld electronic device to save power when the monitored reflected transmitted signal power indicates that operation of the antenna is being disrupted due to proximity effects.

8. The handheld electronic device defined in claim 1, wherein the processing circuitry locks communications circuitry on the handheld electronic device to save power when the monitored reflected transmitted signal power indicates that operation of the antenna is being disrupted due to proximity effects.

9. The handheld electronic device defined in claim 1, further comprising an additional antenna, wherein the processing circuitry selects the additional antenna in the handheld electronic device to use to transmit the radio-frequency signals when the monitored reflected transmitted signal power indicates that operation of the antenna is being disrupted due to proximity effects.

10. The handheld electronic device defined in claim 1 wherein the monitoring and control circuitry comprises a power detection diode coupled to the coupler that measures signals that have been reflected back from the antenna to the power detection diode through the coupler.

11. Wireless communications circuitry in a handheld electronic device comprising:

an antenna;

a coupler that is coupled to the antenna;

transceiver circuitry that transmits radio-frequency signals through the coupler and the antenna;

a reflected power detection circuit that is connected to the coupler, wherein during data transmission by the transceiver circuitry, radio-frequency signals are reflected back into coupler from the antenna and are directed by the coupler to the reflected power detection circuit; and processing circuitry that processes reflected antenna power measurements from the reflected power detection circuit and that provides an alert to a user of the handheld electronic device when the reflected antenna power measurements indicate that operation of the antenna has been disrupted due to proximity effects.

12. The wireless communications circuitry defined in claim 11 wherein the transceiver circuitry comprises analog to digital converter circuitry that converts analog signals from the reflected power detection circuit into digital signals and wherein the processing circuitry compares digitized reflected power measurement signals from the analog to digital converter to a threshold to determine whether operation of the antenna is being disrupted due to proximity effects from a body part of the user of the handheld electronic device.

13. A method of operating a handheld electronic device having an antenna, transceiver circuitry, and monitoring and control circuitry, comprising:

transmitting radio-frequency signals through the antenna from the transceiver circuitry;

with the monitoring and control circuitry, monitoring how much transmitted signal power is reflected back from the antenna when the transceiver circuitry is transmitting the radio-frequency signals to determine whether operation of the antenna is being disrupted due to proximity effects; and providing a blocked antenna indicator for a user of the handheld electronic device that informs the user that an object is covering the antenna when the monitoring and control circuitry determines that operation of the antenna is being disrupted due to proximity effects.

14. The method defined in claim 13 wherein providing the blocked antenna indicator comprises displaying a visual alert on a display in the handheld electronic device.

15. The method defined in claim 13 wherein providing the blocked antenna indicator comprises displaying a visual signal strength indicator on a display in the handheld electronic device and displaying an alert symbol over the signal strength indicator.

16. The method defined in claim 13 wherein providing the blocked antenna indicator comprises displaying a textual alert message on a display in the handheld electronic device.

17. The method defined in claim 13 further comprising shutting down at least some circuitry on the handheld electronic device to save power when it is determined by the monitoring and control circuitry that operation of the antenna is being disrupted due to proximity effects.

* * * * *